(12) United States Patent
Shakhnovich

(10) Patent No.: US 7,223,302 B2
(45) Date of Patent: May 29, 2007

(54) METHODS OF PREPARING AQUEOUS COLORED PIGMENT DISPERSIONS, AND INKJET INK COMPOSITIONS

(75) Inventor: Alexander I. Shakhnovich, Westford, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 10/758,888

(22) Filed: Jan. 16, 2004

(65) Prior Publication Data

US 2004/0163569 A1 Aug. 26, 2004

Related U.S. Application Data

(60) Provisional application No. 60/440,731, filed on Jan. 17, 2003.

(51) Int. Cl.
C09D 11/00 (2006.01)

(52) U.S. Cl. .................................... 106/31.8; 106/499

(58) Field of Classification Search ............... 106/31.8, 106/499
See application file for complete search history.

(56) References Cited

U.S. PATENT DOCUMENTS

| | | | |
|---|---|---|---|
| 3,776,749 A | 12/1973 | McKay et al. .......... 106/288 Q |
| 4,005,068 A * | 1/1977 | Hunger et al. ............... 534/740 |
| 4,665,163 A * | 5/1987 | Hunger et al. ............... 534/746 |
| 4,946,509 A | 8/1990 | Schwartz et al. ........... 106/496 |
| 5,246,494 A * | 9/1993 | Platman et al. ............. 106/496 |
| 5,281,261 A | 1/1994 | Lin et al. .................... 106/20 R |
| 5,418,277 A | 5/1995 | Ma et al. ..................... 524/520 |
| 5,554,739 A | 9/1996 | Belmont ...................... 534/885 |
| 5,571,311 A | 11/1996 | Belmont ..................... 106/20 R |
| 5,630,868 A | 5/1997 | Belmont et al. ......... 106/31.75 |
| 5,672,198 A | 9/1997 | Belmont .................... 106/20 R |
| RE35,654 E * | 11/1997 | Platman et al. ............. 106/496 |
| 5,698,016 A | 12/1997 | Adams et al. ............... 106/316 |
| 5,707,432 A | 1/1998 | Adams et al. ............. 106/31.6 |
| 5,713,988 A | 2/1998 | Belmont et al. ......... 106/31.6 |
| 5,803,959 A | 9/1998 | Johnson et al. ........ 106/31.75 |
| 5,837,045 A | 11/1998 | Johnson et al. ........ 106/31.85 |
| 5,851,280 A | 12/1998 | Belmont et al. ............ 106/472 |
| 5,885,335 A | 3/1999 | Adams et al. ............... 106/316 |
| 5,895,522 A | 4/1999 | Belmont et al. .......... 106/31.6 |
| 5,900,029 A | 5/1999 | Belmont et al. ................ 8/550 |
| 5,914,806 A | 6/1999 | Gordon, II et al. ......... 359/296 |
| 5,922,118 A | 7/1999 | Johnson et al. ........... 106/31.6 |
| 5,952,429 A | 9/1999 | Ikeda et al. ............... 525/326.1 |
| 5,968,243 A | 10/1999 | Belmont et al. ......... 106/31.65 |
| 6,042,643 A | 3/2000 | Belmont et al. ............ 106/472 |
| 6,150,433 A | 11/2000 | Tsang et al. ................. 523/160 |
| 6,221,143 B1 | 4/2001 | Palumbo .................... 106/31.6 |
| 6,221,932 B1 | 4/2001 | Moffatt et al. ............... 523/160 |
| 6,254,671 B1 * | 7/2001 | Hays ........................... 106/496 |
| 6,281,267 B2 | 8/2001 | Parazak ....................... 523/160 |
| 6,294,012 B1 * | 9/2001 | Bindra ........................ 106/496 |
| 6,328,894 B1 | 12/2001 | Chan et al. .................. 210/638 |
| 6,336,965 B1 | 1/2002 | Johnson et al. ............ 106/31.6 |
| 6,375,733 B1 * | 4/2002 | Bindra ........................ 106/496 |
| 6,398,858 B1 | 6/2002 | Yu et al. ................... 106/31.64 |
| 6,432,194 B2 | 8/2002 | Johnson et al. ............. 106/499 |
| 6,451,103 B1 | 9/2002 | Uemura et al. .............. 106/493 |
| 6,478,863 B2 | 12/2002 | Johnson et al. ............ 106/31.6 |
| 6,494,943 B1 | 12/2002 | Yu et al. ................... 106/31.65 |
| 6,494,946 B1 | 12/2002 | Belmont et al. ............ 106/472 |
| 6,506,245 B1 | 1/2003 | Kinney et al. ............... 106/493 |
| 6,602,335 B2 | 8/2003 | Moffatt et al. ............. 106/31.8 |
| 6,641,653 B2 | 11/2003 | Yu .............................. 106/31.6 |
| 6,641,656 B2 | 11/2003 | Yu et al. ...................... 106/493 |
| 6,664,312 B2 | 12/2003 | Devonport .................. 523/205 |
| 6,699,319 B2 | 3/2004 | Adams et al. ............... 106/476 |
| 6,723,783 B2 | 4/2004 | Palumbo et al. ............ 524/555 |
| 6,740,151 B2 | 5/2004 | Belmont et al. ........... 106/31.6 |
| 2001/0003263 A1 | 6/2001 | Johnson et al. ............. 106/413 |
| 2002/0147252 A1 | 10/2002 | Adams ........................ 523/161 |
| 2003/0195291 A1 | 10/2003 | Lamprey et al. ............ 524/495 |
| 2003/0213410 A1 | 11/2003 | Adams et al. ............... 106/499 |
| 2003/0217672 A1 | 11/2003 | Palumbo ..................... 106/473 |

(Continued)

FOREIGN PATENT DOCUMENTS

EP 0 451 094 A1 3/1991

(Continued)

OTHER PUBLICATIONS

International Search Report and Written Opinion for PCT/US2004/001113, mailed Jun. 11, 2004.

*Primary Examiner*—J. A. Lorengo
*Assistant Examiner*—Veronica Faison-Gee

(57) ABSTRACT

The present invention describes methods for preparing aqueous colored pigment dispersions comprising the step of combining, in any order, a) a colored pigment, b) an azo coupler, c) an aromatic amine, d) a diazotizing agent, and e) an aqueous medium, wherein the aromatic amine comprises as least one ionic group, at least one ionizable group, or a mixture of at least one ionic group and at least one ionizable group. These colored pigment dispersions are particularly useful as an inkjet ink composition. Also disclosed are inkjet ink compositions comprising a) a liquid vehicle, b) a colored pigment, and c) a dispersant having the formula:

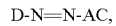

D-N=N-AC, wherein AC is an azo coupling component and D is a diazo component comprising at least one ionic group, at least one ionizable group, or a mixture of at least one ionic group or ionizable group.

33 Claims, No Drawings

U.S. PATENT DOCUMENTS

| | | | |
|---|---|---|---|
| 2004/0007152 A1 | 1/2004 | Palumbo | 106/31.6 |
| 2004/0007161 A1 | 1/2004 | Belmont et al. | 106/499 |
| 2004/0103822 A1 | 6/2004 | Champlin et al. | 106/473 |
| 2004/0163569 A1 | 8/2004 | Shakhnovich | 106/31.8 |
| 2004/0206269 A1 | 10/2004 | Yu | 106/31.6 |
| 2004/0206275 A1 | 10/2004 | Shakhnovich | 106/412 |

FOREIGN PATENT DOCUMENTS

| | | |
|---|---|---|
| EP | 0 649 883 A1 | 10/1994 |
| EP | 0 677 556 A2 | 10/1995 |
| GB | 1359459 | 7/1974 |
| GB | 2356634 | 5/2001 |
| GB | 2356886 | 6/2001 |
| GB | 2364322 | 1/2002 |
| WO | WO00/26304 | 5/2000 |
| WO | WO01/25340 | 4/2001 |
| WO | WO02/94944 | 11/2002 |

\* cited by examiner

METHODS OF PREPARING AQUEOUS COLORED PIGMENT DISPERSIONS, AND INKJET INK COMPOSITIONS

This patent application claims the benefit of U.S. Provisional Patent Application No. 60/440,731, filed Jan. 17, 2003.

BACKGROUND OF THE INVENTION

1. Field of the Invention

The present invention relates to methods for preparing aqueous colored pigment dispersions. Inkjet ink compositions are also disclosed.

2. Description of the Related Art

In general, pigments alone are not readily dispersible in liquid vehicles. A variety of techniques have been developed which can provide stable pigment dispersions. For example, dispersants can be added to the pigment to improve its dispersibility in a particular medium. Examples of dispersants for an aqueous medium include water-soluble polymers and surfactants.

Colored pigment dispersions have been prepared using dispersants having a structural unit similar if not identical to the chemical unit of the colored pigment. For example, GB2356866 discloses a bis-azo compound derived from diazotized (carboxy/sulfo)-anilines and 1,4-bis(acetoacetamido)phenylenes and their use in pigment and ink compositions. These materials were found to be particularly useful in combination with yellow or orange pigments having nearly the identical structure. GB2356634 describes very similar mono-azo compounds for the same use. GB2364322 describes N-(sulfophenyl)-alpha-(2-methoxy-4-nitrophenylazo) acetacetamides for use with monoazo pigments, particularly yellow pigments.

These colored pigment dispersants are prepared by the addition of a diazonium salt (the diazo component) with a compound capable of reacting with a diazonium salt (the azo coupling component). Once prepared, the resulting dispersant is then added, under specified conditions, to the colored pigment in order to form a colored pigment dispersion.

Other methods of controlling the dispersibility of colored pigments are also known. For example, International Patent Application No. WO00/26304 discloses the preparation of a crystal growth inhibitor that controls the amount of crystallinity developed during the process of preparing a colored pigment and prevents recrystallization of dispersed pigments. The crystal growth inhibitor is prepared using a process similar to the known process for preparing the pigment (for example, by the reaction of a diazonium salt with an azo coupling agent), and can also be prepared in situ during the preparation of the colored pigment. Also, in U.S. Pat. No. 6,451,103, water soluble pigment derivatives, which are pigments further substituted with an acidic functional group or salt, are used to prepare aqueous dispersions of that specific pigment. Inkjet inks are also disclosed.

Modified colored pigments have also been developed which provide ink compositions with improved properties, such as dispersibility. For example, U.S. Pat. No. 5,851,280 discloses methods for the attachment of organic groups onto pigments including, for example, attachment via a diazonium reaction wherein the organic group is part of the diazonium salt. The resulting surface-modified pigments can be used in a variety of applications, such as inks, inkjet inks, coatings, toners, plastics, rubbers, and the like.

PCT International Publication No. WO 01/51566 describes a method of making a modified pigment by reacting a first chemical group and a second chemical group to form a pigment having attached a third chemical group. The first chemical group includes at least one nucleophile and the second chemical group includes at least one electrophile, or vice versa. These pigments are used in ink compositions and, in particular, inkjet ink compositions.

While these efforts provide modified pigments with improved properties and, in particular, improved dispersibility, there remains a need for methods of preparing aqueous colored pigment dispersions and inkjet ink compositions.

SUMMARY OF THE INVENTION

The present invention relates to a method of preparing an aqueous colored pigment dispersion comprising the step of combining, in any order, a) a colored pigment, b) an azo coupler, c) an aromatic amine, d) a diazotizing agent, and e) an aqueous medium, wherein the aromatic amine comprises as least one ionic group, at least one ionizable group, or a mixture of at least one ionic group and at least one ionizable group. Specific combinations of steps as well as specific combinations of a)–e) are disclosed.

The present invention further relates to an inkjet ink composition comprising a) a liquid vehicle, b) a colored pigment, and c) a dispersant having the formula:

wherein AC is an azo coupling component and D is a diazo component comprising at least one ionic group, at least one ionizable group, or a mixture of at least one ionic group or ionizable group. Preferably the inkjet ink composition is an aqueous inkjet ink composition.

It is to be understood that both the foregoing general description and the following detailed description are exemplary and explanatory only and are intended to provide further explanation of the present invention, as claimed.

DETAILED DESCRIPTION OF THE INVENTION

The present invention relates to methods for preparing aqueous colored pigment dispersions and inkjet ink compositions.

The method of the present invention comprises the step of combining a) a colored pigment, b) an azo coupler, c) an aromatic amine, d) a diazotizing agent, and e) an aqueous medium. Each of these components will be described in more detail below. The components can be combined in any order and under any condition such that an aqueous colored pigment dispersion results. For example, the colored pigment and azo coupler may be combined, either dry or in a liquid medium, to form a pretreated colored pigment, which is subsequently combined with the aromatic amine and diazotizing agent, preferably in an aqueous medium. Also, the aromatic amine and diazotizing agent may be combined in a liquid medium, preferably an aqueous medium, to form a diazonium salt. This can then be combined, in any order, with the colored pigment and/or azo coupler, or a combination of the colored pigment and azo coupler as described above, to form a colored pigment dispersion. Other combinations are also possible.

As discussed previously, prior art methods for preparing colored pigment dispersions have typically involved the formation of a dispersant, often having structural characteristics similar to the colorant of the colored pigment. These dispersants are formed by combining a diazonium salt, prepared from an aromatic amine and a diazotizing agent, with an azo coupler. The resulting material is then added to the colored pigment to form the final dispersion. Thus, the dispersant for the colored pigment is formed independently of the colored pigment itself. Contrary to the prior art methods, in a preferred embodiment of the method of the present invention, it has surprisingly been found that an azo coupler and diazonium salt, formed by the reaction of an aromatic amine and a diazotizing agent, can be combined in the presence of a colored pigment, resulting in the formation of a colored pigment dispersion. This may be considered to be an in situ method of forming a colored pigment dispersion. Surprisingly, there is no interference of the colored pigment with the reaction of these materials. For example the azo coupler would be expected to have a high affinity for the surface of the colored pigment and would therefore adsorb to the surface, making it unavailable for reaction with a diazonium salt. Alternatively, diazonium salts have been shown to react with colored pigments, and therefore the colored pigment might be expected to compete with the azo coupler, interfering with the reaction. Other potential problems could be anticipated, such as the formation of unwanted by-products, as well as solubility and pH effects. However, despite these potential problems, it has been found that the in situ method of the present invention can be used to successful prepare stable colored pigment dispersions.

When the colored pigment and azo coupler are combined to form a pretreated colored pigment, the resulting pretreated colored pigment may be in either a liquid or a dry form. Thus, for example, a pretreated colored pigment may be prepared by combining an azo coupler and a colored pigment in a liquid medium, preferably an aqueous medium. The liquid form may then be dried to form a pretreated colored pigment solid. The pretreated colored pigment, either the liquid form, or the dry form, may then be combined with the aromatic amine and diazotizing agent. The dry pretreated colored pigment may be in any form, such as, for example, a powder, a pressed cake, a granule, or a pellet.

In addition, the colored pigment may comprise the azo coupler. For example, if the azo coupler is a reagent used during the preparation of the colored pigment, and is used in excess, the resulting colored pigment would comprise colorant and azo coupler. This type of colored pigment, either in the liquid or dry form, has been found to be particularly useful in the method of the present invention. In this case, it has been found that the step of adding azo coupler may be optional.

As stated above, the components used in the method of the present invention may be combined under any conditions which result in an aqueous colored pigment dispersion. Preferably, the components are combined at a temperature between about −10 and about 50 degrees C., more preferably between about 0 and about 25 degrees C., and most preferably between about 0 and about 10 degrees C. Combining the components within these temperature ranges has been found to produce aqueous colored pigment dispersions efficiently and with minimal side products.

It is also preferred that the components are combined under mixing conditions in which shear or a grinding action is also applied to the mixture. This applied shear or grinding action helps to ensure that the components are intimately mixed. A variety of types of equipment known in the art may be used, including, but not limited to, horizontal media mills, vertical media mills such as attritors, ball mills, hammer mills, pin disk mills, fluid energy mills, jet mills, fluid jet mills, impingement jet mills, rotor-stators, pelletizers, homogenizers, sonicators, cavitators, and the like. The same vessel may also be used throughout the method of the present invention.

The colored pigment used in the method of the present invention may be chosen from a wide range of conventional colored pigments. The colored pigment can be blue, black, brown, cyan, green, white, violet, magenta, red, orange, or yellow, as well as mixtures thereof. Mixtures of pigments may also be used. Suitable classes of colored pigments include, for example, disazos, monoazos, and heterocyclic azo yellows (including diarylides and disazo condensation pigments), and naphthol-AS's. Representative examples of azo yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, and Pigment Yellow 128. Representative examples of naphthol-AS's include Pigment Red 170, Pigment Red 185, Pigment Red 187, Pigment Red 238, Pigment Red 269, Pigment Orange 38, and Pigment Violet 25. Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982).

The colored pigment can have a wide range of BET surface areas, as measured by nitrogen adsorption, and therefore, a wide range of particle sizes. It is preferred to have a colored pigment having a small particle size in order to prepare colored pigment dispersions having desirable overall properties, such as stability. If the preferred smaller particle size (and therefore higher surface area) colored pigment is not readily available, it is well recognized by those skilled in the art that the colored pigment may be subjected to conventional size comminution or reduction techniques, such as ball or jet milling, to reduce the pigment to the desired particle size prior to use in the method described herein.

The azo coupler used in the method of the present invention is a material capable of reacting to form an azo compound. The reaction of azo couplers are well known in the art. In general, an azo coupler reacts with a diazonium reagent to form an azo compound, which is a material having an —N═N— functionality. Examples of azo couplers that may be used in the method of the present invention include, but are not limited to, 1,3-dicarbonyl compounds such as a cetoacetamides, including (acetoacetamido)benzimidazolones, and acetoacetic esters; electron rich aromatic compounds such as phenols and hydroxynaphthalenes; barbituric acid and derivatives of barbituric acid; and electron rich heteroaromatic compounds such as hydroxypyridones and pyrazolones.

It is preferred that the azo coupler be structurally similar to the colored pigment used. In particular, it is preferred that the azo coupler be structurally similar or identical to the azo coupler used to prepare the colored pigment. In this way, the azo coupler, and any associated reaction products resulting from the method described herein, will have a high affinity for the colored pigment and may therefore interact more strongly with the colored pigment, to produce a colored pigment dispersion having desirable overall properties.

Thus, for example, the azo coupler may comprise an a cetoacetamide group, such as acetoacet-o-anisidide. This type of azo coupler is preferably used with a disazo or monoazo pigment also comprising an acetoacetamide group.

Examples include, but are not limited to, yellow pigments such as Pigment Yellow 74, Pigment Yellow 65, and Pigment Yellow 73.

The azo coupler may also comprise a hydroxypyridone group. For example, the azo coupler may be a hydroxypyridone having the general structure:

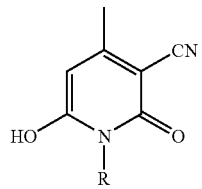

wherein R is a hydrogen, a substituted or unsubstituted, saturated or unsaturated alkyl group, a substituted or unsubstituted aromatic group, or a substituted or unsubstituted heteroaromatic group. Preferably R is H, a methyl group, or an ethyl group. This type of azo coupler is preferably used with a disazo or monoazo pigment also comprising an hydroxypyridone group. Examples include, but are not limited to, yellow or orange pigments Pigment Yellow 201 and Disperse Yellow 241.

The azo coupler may also comprise a hydroxynaphthalene group. For example, the azo coupler may be a derivative of 2-hydroxynaphthalene-3-carboxylic acid. Examples include amides of 2-hydroxynaphthalene-3-carboxylic acid such as naphthol AS, naphthol AS-PH, naphthol AS-OL, naphthol AS-KB, naphthol AS-LC, naphthol AS-BG, naphthol AS-BO, naphthol AS-BS, naphthol AS-CA, naphthol AS-D, and naphthol AS-ITR. This type of azo coupler is preferably used with naphthol-AS pigments which also comprise a hydroxynaphthalene group. Examples include, but are not limited, to, red, magenta, or violet pigments such as Pigment Red 170, Pigment Red 185, Pigment Red 238, Pigment Red 269, Pigment Orange 38, and Pigment Violet 25.

An aromatic amine is also used in the method of the present invention. Preferably, the aromatic amine comprises at least one ionic group, at least one ionizable group, or a mixture of at least one ionic group and at least one ionizable group. An ionic group is either anionic or cationic and is associated with a counterion of the opposite charge including inorganic or organic counterions such as $Na^+$, $K^+$, $Li^+$, $NH_4^+$, $NR'_4^+$ acetate, $NO_3^-$, $SO_4^{-2}$, $R'SO_3^-$, $R'OSO_3^-$, $OH^-$, and $Cl^-$, where R' represents hydrogen or an organic group such as a substituted or unsubstituted aryl and/or alkyl group. An ionizable group is one that is capable of forming an ionic group in the medium of use. Anionizable groups form anions and cationizable groups form cations. Organic ionic groups include those described in U.S. Pat. No. 5,698,016, the description of which is fully incorporated herein by reference.

The ionic or ionizable group may be an anionic or anionizable group. Anionic groups are negatively charged ionic groups that may be generated from groups having ionizable substituents that can form anions (anionizable groups), such as acidic substituents. They may also be the anion in the salts of ionizable substituents. Representative examples of anionic groups include —$COO^-$, —$SO_3^-$, —$OSO_3^-$, —$HPO_3^-$, —$OPO_3^{-2}$, and —$PO_3^{-2}$. Representative examples of anionizable groups include —COOH, —$SO_3H$, —$PO_3H_2$, —R'SH, —R'OH, and —$SO_2NHCOR'$, where R' represents hydrogen or an organic group such as a substituted or unsubstituted aryl and/or alkyl group. Preferably the aromatic amine comprises at least one sulfonic acid group, carboxylic acid group, or salts thereof.

The ionic or ionizable group may also be a cationic or cationizable group. Cationic groups are positively charged organic ionic groups that may be generated from ionizable substituents that can form cations (cationizable groups), such as protonated amines. For example, alkyl or aryl amines may be protonated in acidic media to form ammonium groups —$NR'_2H^+$, where R' represent an organic group such as a substituted or unsubstituted aryl and/or alkyl group. Cationic groups may also be positively charged organic ionic groups. Examples include quaternary ammonium groups (—$NR'_3^+$) and quaternary phosphonium groups (—$PR'_3^+$). Here, R' represents hydrogen or an organic group such as a substituted or unsubstituted aryl and/or alkyl group. Preferably, the aromatic amine comprises at least one amine group or a salt thereof, or at least one quaternary ammonium group.

The aromatic amine may further be substituted with one or more functional groups. Examples of functional groups include, but are not limited to, R", OR", COR", COOR", OCOR", carboxylates, halogens, CN, $NR''_2$, $SO_3H$, sulfonates, sulfates, NR"(COR"), $CONR''_2$, $NO_2$, $PO_3H_2$, phosphonates, phosphates, N=NR", SOR", $NSO_2R''$, wherein R", which can be the same or different, is independently hydrogen, branched or unbranched $C_1$–$C_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkaryl, or substituted or unsubstituted aralkyl. Preferably the aromatic amine is p-aminobenzoic acid or sulfanilic acid.

A diazotizing agent is also combined in the method of the present invention. A diazotizing agent is any reagent that reacts with an amine group to form a diazonium salt. Examples include nitrous acid and nitrite salts. Preferably, the diazotizing agent is a salt having a nitrite counterion such as sodium nitrite, potassium nitrite, or calcium nitrite. The diazotizing agent may also be the aromatic amine comprising a cationic group, such as a quaternary ammonium group, in which the counterion of the quaternary ammonium group is a nitrite.

The aqueous medium used in the method of the present invention is any medium containing water. Thus, the aqueous medium can be, for example, water or mixtures of water with water miscible solvents such as alcohols. Preferably the aqueous vehicle is water. The aqueous medium may be any pH but is preferably acidic. Thus, acid may preferably be added to the aqueous medium in order to form a low pH aqueous medium.

The amounts of each component may be varied in order to obtain a colored pigment dispersion having desirable overall properties. Thus, the amount of azo coupler is preferably about 0.05–10%, more preferably about 0.1–5%, and most preferably about 1–5% based on the total weight of colored pigment. The amount of aromatic amine is generally greater than or equal to one molar equivalent based on the amount of azo coupler. Preferably the aromatic amine is used up to about a 50% molar excess. The diazotizing agent is preferably used at the same molar amount as the aromatic amine. The amount of colored pigment is preferably about 0.5–50%, more preferably about 1–20%, and most preferably about 1–5% by weight based on the total weight of colored pigment dispersion.

In a preferred embodiment of the method of the present invention, the azo coupler, aromatic amine, and diazotizing agent react to form a dispersant having the general formula:

D-N=N-AC, wherein AC is an azo coupling component and D is a diazo component comprising at least one ionic group, at least one ionizable group, or a mixture of at least one ionic group or ionizable group. The ionic or ionizable groups may be any of those described above for the aromatic amine. The group D may be further substituted with the same groups described for the aromatic amine above. The group AC may comprise the same groups as described above for the azo coupler. Thus, for example, the group AC may comprise an acetoacetamide group, an hydroxypyridone group, a pyrazolone group, or an hydroxynaphthalene group, as described above.

The colored pigment dispersions prepared by the method of the present invention may be purified by washing, such as by filtration, centrifugation, or a combination of the two methods, to remove unreacted raw materials, byproduct salts and other reaction impurities. The products may also be isolated, for example, by evaporation or it may be recovered by filtration and drying using known techniques to those skilled in the art.

The colored pigment dispersions may also be purified or classified to remove impurities and other undesirable free species which can co-exist in the dispersion as a result of the manufacturing process. For example, the dispersion can be purified to remove any undesired free species, such as unreacted azo coupler or aromatic amine. Known techniques of ultrafiltration/diafiltration using a membrane or ion exchange may be used to purify the dispersion and remove a substantial amount of free ionic and unwanted species. An optional exchange of counterions step may also occur in the purification process whereby the counterions that form a part of the modified pigment are exchanged or substituted with alternative counterions (including, e.g., amphiphilic ions) utilizing known ion exchange techniques such as ultrafiltration, reverse osmosis, ion exchange columns and the like. Particular examples of counterions that can be exchanged include, but are not limited to, $Na^+$, $K^+$, $Li^+$, $NH_4^+$, $Ca^{2+}$, $Mg^{2+}$, $Cl^-$, $NO_3^-$, $NO_2^-$, acetate, and $Br^-$.

The colored pigment dispersions can be formed with a minimum of additional components (additives and/or cosolvents) and processing steps. However, additives such as surfactants and cosolvents may also be included.

The colored pigment dispersions prepared by the method of the present invention may be useful in a variety of applications, including, but not limited to inks, coatings, plastics, paper, textiles, and rubber products. In particular, the colored pigment dispersions have surprisingly been found to be effective inkjet ink compositions.

Therefore, the present invention also relates to an inkjet ink composition comprising a) a liquid vehicle, b) a colored pigment, and c) a dispersant having the formula:

D-N=N-AC, wherein AC is an azo coupling component and D is a diazo component comprising at least one ionic group, at least one ionizable group, or a mixture of at least one ionic group or ionizable group. The groups AC and D are the same as were described above.

In general, an inkjet ink composition consists of a vehicle, which functions as a carrier, and a colorant such as a dye or pigment. Additives and/or cosolvents can be incorporated in order to adjust the ink to attain the desired performance. Preferably, the liquid vehicle for the inkjet ink compositions of the present invention is an aqueous vehicle, and the inkjet ink composition is therefore an aqueous inkjet ink composition. The aqueous vehicle can be the same as described above in relation to the method of preparing the colored pigment dispersion.

The colored pigments used in the inkjet ink compositions of the present invention are the same as were described above and are present in an amount effective to provide the desired image quality (for example, optical density) without detrimentally affecting the performance of the inkjet ink. For example, typically the colored pigment will be present in an amount ranging from about 0.1% to about 20% based on the weight of the ink. Mixtures of pigments may also be used. In addition, it is also within the bounds of the present invention to use a formulation containing a modified pigment product as described in, for example, U.S. Pat. Nos. 5,630,868, 5,803,959, 5,837,045, and 5,922,118, all incorporated in their entirety by reference.

The inkjet ink compositions of the present invention can be formed with a minimum of additional components (additives and/or cosolvents) and processing steps. However, suitable additives may also be incorporated into these inkjet ink compositions to impart a number of desired properties while maintaining the stability of the compositions. For example, surfactants may be added to further enhance the colloidal stability of the composition. Other additives are well known in the art and include humectants, biocides, binders, drying accelerators, penetrants, and the like. The amount of a particular additive will vary depending on a variety of factors but are generally present in an amount ranging between 0% and 40%.

Additionally, the inkjet ink compositions of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like.

The dispersant may be prepared by any method known in the art, but is preferably prepared using the method described above. Thus, a preferred method for preparing this dispersant is to combine an azo coupler, an aromatic amine comprising at least one ionic group, at least one ionizable group, or a mixture of at least one ionic or ionizable group, and a diazotizing agent in an aqueous medium in the presence of a colored pigment. However, prior art methods of forming the dispersant may also be used. Thus, a diazonium salt, formed by the reaction of an aromatic amine and a diazotizing agent, can be combined with the azo coupler to form the dispsersant, which can then be combined with the colored pigment to form a stable dispersion that has surprisingly been found to be useful in an inkjet ink composition. The azo coupler, aromatic amine, diazotizing agent, and aqueous medium are as described above.

Preferred examples of dispersants having the formula shown include those in which the group AC comprises an acetoacetamide group, an hydroxypyridone group, a pyrazolone group, or an hydroxynaphthalene group. Thus, for example, a preferred dispersant has the formula:

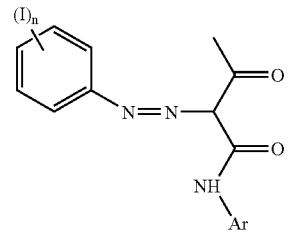

wherein n is an integer from 1–5, I is an ionic group or an ionizable group, and Ar is a substituted or unsubstituted aromatic group. This type of dispersant has been found to be particularly useful in an inkjet ink composition comprising a colored pigment also comprising an acetoacetamide group, such as those described above. Another preferred dispersant has the formula:

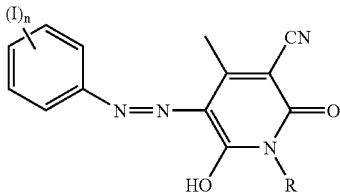

wherein R is a hydrogen, a substituted or unsubstituted, saturated or unsaturated alkyl group, a substituted or unsubstituted aromatic group, or a substituted or unsubstituted heteroaromatic group, and n and I are as described above. This type of dispersant has been found to be particularly useful in an inkjet ink composition comprising a colored pigment also comprising a hydroxypyridone group, such as those described above. Yet another preferred dispersant has the formula:

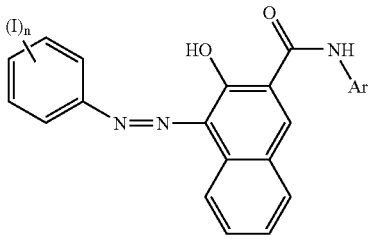

wherein n, I, and Ar are as described above. This type of dispersant has been found to be particularly useful in inkjet ink compositions comprising a colored pigment also comprising a hydroxynaphthalene group, such as those described above. Other combinations of pigments and dispersants will be known to those skilled in the art based on the disclosure herein.

The inkjet ink compositions can be purified and/or classified using methods such as those described above for the colored pigment dispersions described above. In this way, unwanted impurities or undesirable large particles can be removed to produce an inkjet ink with good overall properties.

The present invention will be further clarified by the following examples which are intended to be only exemplary in nature.

EXAMPLES

Example 1

A rotor-stator high shear mixer (Silverson L4RT-A) was fitted with a 4 liter stainless steel beaker and was immersed in an ice bath. Approximately 75 g of Pigment Yellow 74 and 1000 g of water were placed into the beaker and the mixture was homogenized for 15 min at 7,200 rpm. To this was added a solution of 2.07 g (0.01 mol) of acetoacet-o-anisidide in 20 mL of isopropanol, and the mixture was stirred for an additional 15 minutes.

In a separate vessel, 4.35 g (0.025 mol) of sulfanilic acid were mixed with 30 ml 1 N HCl and 1.73 g (0.025 mol) of sodium nitrite at 5–10 degrees C., forming the corresponding diazonium salt. This was then added to the mixture of Pigment Yellow 74 and acetoacet-o-anisidide, with stirring. The temperature was maintained at approximately 10 degrees C. The mixture was adjusted to a pH of 5–6 by dropwise addition of a 5M sodium hydroxide solution. Mixing was continued for an additional 2 hours. The reaction progress was monitored by removing small portions of the mixture and adding this to a 0.1% aminosalycilic acid solution in 1M $Na_2CO_3$ to show the absence of diazonium salt. Thus, a drop of the reaction mixture is placed on a piece of filter paper, and a drop of the aminosalycilic acid solution is placed next to the drop of the reaction mixture. An orange color will form where the runouts of the two drops touch to indicate the presence of diazonium salt in the reaction mixture.

The mixture was transferred to a Telsonic flow-through sonicator and sonicated for 2 hours, to produce an aqueous colored pigment dispersion. The resulting yellow pigment dispersion was purified using a 50 nm diafiltration membrane column and concentrated to solids content of 10%. The median particle size of the bright yellow dispersion was about 170 nm.

This example shows an embodiment of the method of the present invention in which the colored pigment and azo coupler are combined to form a pretreated colored pigment dispersion. The aromatic amine and diazotizing agent are also combined together in an aqueous medium. The resulting aqueous colored pigment dispersion was found to have good properties and, in particular, good particle size. In addition, this colored pigment dispersion was shown to have excellent stability based on results of a four hour freeze-thaw cycle test (3.5% pigment in the presence of 20% humectant) as well as in an oven test (60 degrees C. for 1 week) and therefore could be used to prepare an inkjet ink composition.

Example 2

A rotor-stator high shear mixer (Silverson L4RT-A) was fitted with a 4 liter stainless steel beaker, and was immersed in an ice bath. Approximately 75 g of Pigment Yellow 74 and 1000 g of water were placed into the beaker and the mixture was homogenized for 15 min at 7,200 rpm. A solution of 3.85 g of Compound I shown below (prepared by azo coupling of the diazonium salt of sulfanilic acid with acetoacet-o-anisidide at pH 4.5–6.0 using a 1:1 molar ratio of diazonium salt to azo coupler) in 200 ml of water was then added.

Compound I

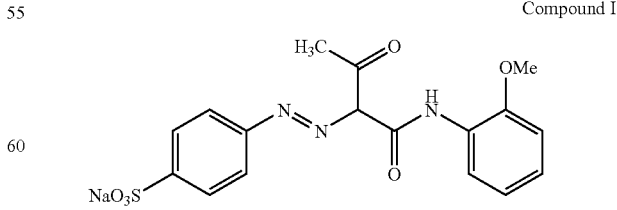

The mixture was then stirred for an additional 2 hours.
The mixture was transferred to a Telsonic flow-through sonicator and sonicated for 2 hours, to produce an aqueous colored pigment dispersion. The resulting yellow pigment dispersion was purified using a 50 nm diafiltration membrane column and concentrated to solids content of 10%. The median particle size of the bright yellow dispersion was about 150 nm.

This example shows an embodiment of the method of the present invention in which the azo coupler, aromatic amine, and diazotizing agent react in an aqueous medium to form a dispersant having the formula D-N=N-AC. The resulting aqueous colored pigment dispersion was found to have good properties and, in particular, good particle size. In addition, this colored pigment dispersion was shown to have excellent stability based on results of a four hour freeze-thaw cycle test (3.5% pigment in the presence of 20% humectant) as well as in an oven test (60 degrees C. for 1 week) and therefore could be used to prepare an inkjet ink composition. Thus, this example further shows an embodiment of the inkjet ink composition of the present invention comprising a dispersant having the formula D-N=N-AC.

Example 3

Compound 2, shown below, was prepared using the following procedure. Sulfanilic acid (0.1 mol) was diazotized by consecutive additions of 125 mL of 1N HCl and 50 mL of a 2M sodium nitrite solution at 0–5 degrees C. The resulting suspension of diazonium salt was added to a 0.1M solution of Naphthol AS-CA (2 methoxy-5-chloroanilide of 2-hydroxy-3-naphthoic acid) in 100 mL of 1M NaOH mixed with 300 g of ice. Coupling was conducted at pH 5–6, which was maintained by gradual addition of 50 g of solid sodium acetate.

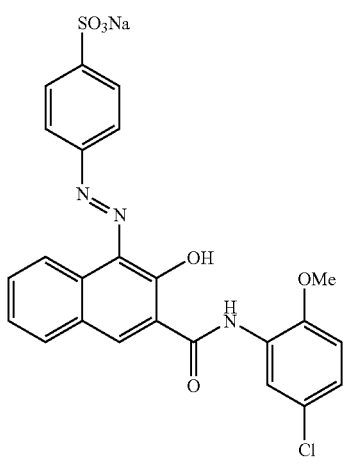

Compound 2

Compound 2, formed in the reaction, was isolated by centrifugation and recrystallized from isopropanol/water (1/1).

Compound 2 (0.2 g) was dissolved in 500 mL of hot water, and the solution was cooled down to 25–30 degrees C. Approximately 4 g of Pigment Red 269 (Sunbrite Red 435–4438, available from Sun Chemicals Corporation, Cincinnati, Ohio) was added and the mixture homogenized in a Silverson rotor-stator mixer for 30 minutes. The resulting maroon dispersion was sonicated for 45 minutes using an immersion probe, giving a colored pigment dispersion having median particle size of 250 nm which was found to be a stable dispersion.

This example shows an embodiment of the method of the present invention in which the azo coupler, aromatic amine, and diazotizing agent react in an aqueous medium to form a dispersant having the formula D-N=N-AC. The resulting aqueous colored pigment dispersion was found to have good properties and, in particular, good particle size. In addition, this colored pigment dispersion was shown to have excellent stability based on results of a four hour freeze-thaw cycle test (3.5% pigment in the presence of 20% humectant) as well as in an oven test (60 degrees C. for 1 week) and therefore could be used to prepare an inkjet ink composition. Thus, this example further shows an embodiment of the inkjet ink composition of the present invention comprising a dispersant having the formula D-N=N-AC.

Example 4

A mixture of 75 g Pigment Yellow 74, 2.07 g (0.01 mol) of acetoacet-o-anisidide, 1.73 g (0.01 mol) of sulfanilic acid, and 750 mL of DI water was homogenized for 30 min using a Silverson rotor-stator mixer. The mixture was then put into an ice bath and homogenization was continued for another 30 min, during which time the temperature dropped to 5 degrees C. A solution of 0.7 g (0.011 mol) of sodium nitrite in 50 mL of water was added at once, and stirring was continued for another 3 hours. The pH of the mixture was kept between 4.5 and 6 by dropwise addition of a 4M solution of sodium acetate.

After 3 hours of stirring, the mixture was tested to ensure no diazonium salt remained using the method described in Example 1. At this time, the median particle size of the colored pigment dispersion was about 400 nm. The mixture was transferred to a Telsonic flow through sonicator and sonicated for 2 hours, bringing the particle size down to 170 nm. The dispersion was then diafiltered to remove inorganic salts and concentrated to 10% solids. The resulting colored pigment dispersion showed excellent stability on storage.

Example 5

A mixture of 75 g Pigment Yellow 74 and 750 mL of DI water was homogenized for 30 min using a Silverson rotor-stator mixer. A solution of 2.07 g (0.01 mol) of acetoacet-o-anisidide in 50 ml of isopropanol was added at once and stirring was continued for 20 min. This resulted in the formation of a pretreated colored pigment dispersion, which was then put into an ice bath and homogenized for another 30 min, during which time the temperature dropped to 5 degrees C.

In a separate vessel, 0.01 mol of sulfanilic acid was diazotized by consecutive addition of 12.5 mL of 1N HCl and 5 mL of 2M sodium nitrite solution at 0–5 degrees C., forming the corresponding diazonium salt. This was then added at once to the pretreated colored pigment dispersion, and stirring was continued for another 3 hours. The pH of the mixture was kept between 4.5 and 6 by dropwise addition of a 1 OM solution of sodium acetate.

After 3 hours of stirring, the mixture was tested to ensure that no diazonium salt remained using the method described in Example 1. At this time median particle size was about 400 nm. The mixture was transferred to a Telsonic flow through sonicator and sonicated for 2 hours, bringing particle size down to 170 nm. The dispersion was diafiltered to remove inorganic salts and concentrated to 10% solids. The resulting colored pigment dispersion showed excellent stability on storage.

This example shows an embodiment of the method of the present invention in which the colored pigment and azo coupler are combined to form a pretreated colored pigment dispersion. The aromatic amine and diazotizing agent are also combined together in an aqueous medium. The resulting aqueous colored pigment dispersion was found to have good properties and, in particular, good particle size. In addition, this colored pigment dispersion was shown to have excellent stability based on results of a four hour freeze-thaw cycle test (3.5% pigment in the presence of 20% humectant) as well as in an oven test (60 degrees C. for 1 week) and therefore could be used to prepare an inkjet ink composition.

Example 6

15.96 g (0.095 mol) of 4-nitro-2-anisidine was mixed with 50 mL water, followed by 21 mL of 96% sulfuric acid, in a 500 mL beaker. The mixture was stirred until no more undissolved 4-nitro-2-anisidine was visible (approximately one hour). The solution was cooled to 0–5 degrees C., and a solution of 6.9 g (0.1 mol) of sodium nitrite in 50 mL water was slowly added. The mixture was stirred for 30 min at 0–5 degrees C., and excess diazonium salt was destroyed by addition of 1.0 g of sulfamic acid.

The diazonium salt solution was added to a slurry of 20.7 g (0.1 mol) of acetoacet-o-anisidide in 500 ml of ice-water mixture at pH 4.5–6.0, which was maintained by addition of solid sodium acetate. The resulting colored pigment was filtered off and washed with warm water to give a colored pigment comprising an azo coupler (the presscake contained 95% Pigment Yellow 74 and 5% of acetoacet-o-anisidide).

The obtained presscake was dispersed in 500 mL of water using a Silverson rotor-stator mixer. External cooling was applied to bring the temperature of the pigment slurry to 0–5 degrees C. A dispersion of 4-sulfonatophenyldiazonium salt (prepared from 0.01 mol of sulfanilic acid, 0.012 mol of HCl and 0.01 mol of sodium nitrite in 5 mL water) was added at once to the pigment slurry, and the pH was brought up to 4.5–6 by addition of 4M solution of sodium acetate.

After 2 hrs of stirring at 0–5 degrees C., the mixture was tested to ensure no diazonium salt remained using the method described in Example 1. At this time the median particle size of the colored pigment dispersion was about 400 nm. The mixture was transferred to a Telsonic flow through sonicator and sonicated for 2 hours, bringing the particle size down to 160 nm. The dispersion was then diafiltered to remove inorganic salts and concentrated to 10% solids. The resulting colored pigment dispersion showed excellent stability on storage.

This example shows an embodiment of the method of the present invention in which the colored pigment comprises the azo coupler. The resulting aqueous colored pigment dispersion was found to have good properties and, in particular, good particle size. In addition, this colored pigment dispersion was shown to have excellent stability based on results of a four hour freeze-thaw cycle test (3.5% pigment in the presence of 20% humectant) as well as in an oven test (60 degrees C. for 1 week) and therefore could be used to prepare an inkjet ink composition.

Example 7

Compound 3, shown below, was prepared using the following procedure. p-Aminobenzoic acid (0.1 mol) was diazotized by consecutive additions of 125 mL of 1N HCl and 50 mL of a 2M sodium nitrite solution at 0–5 degrees C. The resulting suspension of diazonium salt was added to a solution of 0.1 mol of 5-(acetoacetamido)benzimidazolone in 120 mL of 1M NaOH mixed with 300 g of ice. Coupling was conducted at pH 5–6, which was maintained by gradual addition of 50 g of solid sodium acetate.

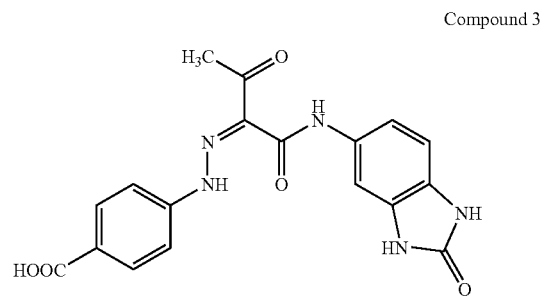

Compound 3

Compound 3, formed in the reaction, was isolated by centrifugation and recrystallized from isopropanol/water (1/1).

Compound 3 (3.81 g; 0.01 mol) was dissolved in a mixture of 500 mL of hot water and 10 ml of 1 N NaOH, and the solution was cooled down to 25–30 degrees C. Approximately 40 g of Pigment Yellow 180 (Toner Yellow HG, available from Clariant Corporation, Coventry, R.I.) was added and the mixture homogenized in a Silverson rotor-stator mixer for 30 minutes. The resulting yellow dispersion was sonicated for 45 minutes using a flow-through sonicator, giving a colored pigment dispersion having median particle size of 221 nm which was found to be a stable dispersion.

This example shows an embodiment of the method of the present invention in which the azo coupler, aromatic amine, and diazotizing agent react in an aqueous medium to form a dispersant having the formula D-N=N-AC. The resulting aqueous colored pigment dispersion was found to have good properties and, in particular, good particle size.

Example 8

Compound 3 (3.81 g; 0.01 mol), prepared as described in Example 7 above, was dissolved in the mixture of 500 mL of hot water and 10 ml of 1 N NaOH, and the solution was cooled down to 25–30 degrees C. Approximately 40 g of Pigment Red 185 (Novoperm Carmine HF4C, available from Clariant Corporation, Coventry, R.I.) was added and the mixture homogenized in a Silverson rotor-stator mixer for 30 minutes. The resulting red dispersion was sonicated for 45 minutes using a flow-through sonicator, giving a colored pigment dispersion having median particle size of 223 nm which was found to be a stable dispersion.

This example shows an embodiment of the method of the present invention in which the azo coupler, aromatic amine, and diazotizing agent react in an aqueous medium to form a dispersant having the formula D-N=N-AC. The resulting aqueous colored pigment dispersion was found to have good properties and, in particular, good particle size.

Example 9

Compound 4, shown below, was prepared using the following procedure. Sulphanilic acid (0.1 mol) was diazotized by consecutive additions of 125 mL of 1N HCl and 50 mL of a 2M sodium nitrite solution at 0–5 degrees C. The resulting suspension of diazonium salt was added to a solution of 0.1 mol of N-(acetoacetyl)-2,5-dimethoxy-4- chloroaniline (Naphtol AS-IRG) in 120 mL of 1M NaOH mixed with 300 g of ice. Coupling was conducted at pH 5–6, which was maintained by gradual addition of 50 g of solid sodium acetate.

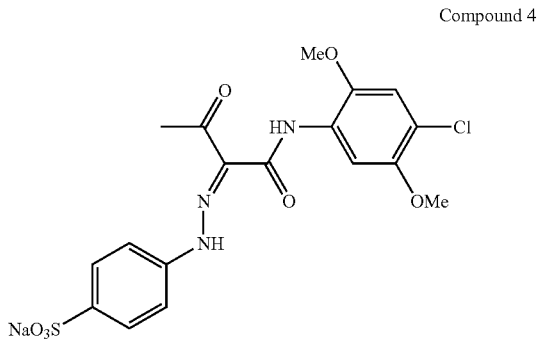

Compound 4

Compound 4, formed in the reaction, was isolated by centrifugation and recrystallized from isopropanol/water (1/1).

A batch of Pigment Yellow 97 presscake was prepared by the following method. 2,5-Dimethoxy-4-anilidosulphonylaniline (0.1 mol) was slurried with 220 mL of 1 N hydrochloric acid and was diazotized by addition of 0.1 mol of a sodium nitrite solution. The resulting diazonium salt was gradually added to a fine dispersion of 0.1 mol of N-(acetoacetyl)-2,5-dimethoxy-4-chloroaniline (Naphtol AS-IRG). During the addition, the pH was maintained at 4.5–6.5 by the addition of solid sodium acetate. The resulting slurry of Pigment Yellow 97 was filtered off and the presscake was washed with water until the conductivity of the filtrate reached 200 microsiemens.

The wet pigment presscake was combined with 1 liter of DI water and 4.0 g of Compound 4 and the mixture homogenized in a Silverson rotor-stator mixer for 30 minutes. The resulting yellow dispersion was sonicated for 45 minutes using a flow-through sonicator, giving a colored pigment dispersion having median particle size of 241 nm which was found to be a stable dispersion.

This example shows an embodiment of the method of the present invention in which the azo coupler, aromatic amine, and diazotizing agent react in an aqueous medium to form a dispersant having the formula D-N=N-AC. The resulting aqueous colored pigment dispersion was found to have good properties and, in particular, good particle size.

What is claimed is:

1. A method of preparing an aqueous colored pigment dispersion comprising the steps of a) combining a colored pigment and an azo coupler to form a pretreated colored pigment, and b) combining, in any order, the pretreated colored pigment, an aromatic amine, a diazotizing agent, and an aqueous medium, wherein the aromatic amine comprises as least one ionic group, at least one ionizable group, or a mixture of at least one ionic group and at least one ionizable group.

2. The method of claim 1, wherein the pretreated colored pigment is in a liquid form.

3. The method of claim 1, wherein the pretreated colored pigment is in a dry form.

4. The method of claim 1, wherein the pretreated colored pigment is formed in the aqueous medium.

5. The method of claim 1, wherein the aromatic amine and diazotizing agent are combined to form a diazonium reagent.

6. The method of claim 5, wherein the diazonium reagent is formed in the aqueous medium.

7. The method of claim 1, wherein the colored pigment comprises a blue pigment, a black pigment, a brown pigment, a cyan pigment, a green pigment, a white pigment, a violet pigment, a magenta pigment, a red pigment, an orange pigment, a yellow pigment, or mixtures thereof.

8. A method of preparing an aqueous colored pigment dispersion comprising the step of combining, in any order, a) a colored pigment, b) an azo coupler, c) an aromatic amine, d) a diazotizing agent, and e) an aqueous medium, wherein the aromatic amine comprises as least one ionic group, at least one ionizable group, or a mixture of at least one ionic group and at least one ionizable group, and wherein the azo coupler comprises an acetoacetamide group, an hydroxypyridone group, a 2-hydroxynaphthalene group, or an (acetoacetamido)benzimidazolone group.

9. The method of claim 8, wherein the azo coupler comprises an acetoacetamide group and wherein the colored pigment is a disazo or monoazo pigment.

10. The method of claim 8, wherein the azo coupler comprises an hydroxypyridone group and wherein the colored pigment is a disazo or monoazo pigment.

11. The method of claim 8, wherein the azo coupler comprises a 2-hydroxynaphthalene group and wherein the colored pigment is a naphthol-AS pigment.

12. The method of claim 1, wherein the azo coupler comprises a pyrazolone group.

13. The method of claim 1, wherein the colored pigment comprises the azo coupler.

14. The method of claim 1, wherein the aromatic amine comprises at least one —COO$^-$, —SO$_3^-$, —OSO$_3^-$, —HPO$_3^-$, —OPO$_3^{-2}$, —PO$_3^{-2}$, amine, or ammonium group.

15. The method of claim 1, wherein the aromatic amine comprises at least one sulfonic acid group, carboxylic acid group, or salt thereof.

16. The method of claim 1, wherein the diazotizing agent is a nitrite.

17. The method of claim 1, wherein the aqueous medium is water.

18. The method of claim 1, further comprising the step of adding an acid.

19. The method of claim 1, wherein the azo coupler, aromatic amine, and diazotizing agent react in the aqueous medium to form a dispersant having the formula:

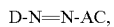

D-N=N-AC, wherein AC is an azo coupling component and D is a diazo component comprising at least one ionic group, at least one ionizable group, or a mixture of at least one ionic group or ionizable group.

20. The method of claim 1, wherein the aqueous colored pigment dispersion is an inkjet ink composition.

21. An inkjet ink composition comprising a) a liquid vehicle, b) a colored pigment, and c) a dispersant having the formula:

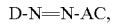

D-N=N-AC, wherein AC is an azo coupling component and D is a diazo component comprising at least one ionic group, at least one ionizable group, or a mixture of at least one ionic group or ionizable group.

22. The inkjet ink composition of claim 21, wherein D comprises at least one sulfonic acid group, carboxylic acid group, or salt thereof.

23. The inkjet ink composition of claim 21, wherein AC comprises an acetoacetamide group.

24. The inkjet ink composition of claim 23, wherein the colored pigment is a disazo or monoazo pigment.

25. The inkjet ink composition of claim 21, wherein the dispersant has the formula:

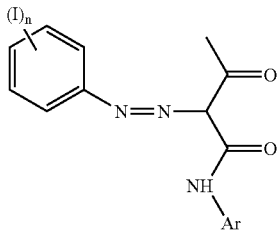

wherein I is an ionic group or an ionizable group; n is an integer between 1 and 5; and Ar is a substituted or unsubstituted aromatic group.

26. The inkjet ink composition of claim 21 wherein AC comprises an hydroxypyridone group.

27. The inkjet ink composition of claim 26, wherein the colored pigment is a disazo or monoazo pigment.

28. The inkjet ink composition of claim 21, wherein the dispersant has the formula:

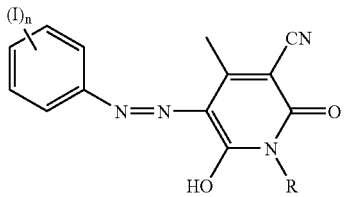

wherein I is an ionic group or an ionizable group; n is an integer between 1 and 5; and R is a substituted or unsubstituted, saturated or unsaturated alkyl group; a substituted or unsubstituted aromatic group; or a substituted or unsubstituted heteroaromatic group.

29. The inkjet ink composition of claim 21, wherein AC comprises a 2-hydroxynaphthalene group.

30. The inkjet ink composition of claim 29, wherein the colored pigment is a naphthol-AS pigment.

31. The inkjet ink composition of claim 21, wherein the dispersant has the formula:

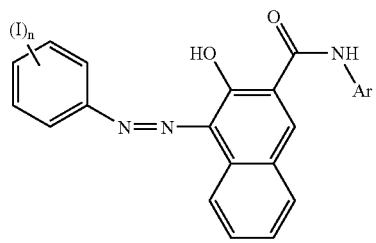

wherein I is an ionic group or an ionizable group; n is an integer between 1 and 5; and Ar is a substituted or unsubstituted aromatic group.

32. The inkjet ink composition of claim 21, wherein the inkjet ink composition is an aqueous inkjet ink composition.

33. A method of preparing an aqueous colored pigment dispersion comprising the step of combining, in any order, a colored pigment comprising an azo coupler, an aromatic amine, a diazotizing agent, and an aqueous medium, wherein the aromatic amine comprises as least one ionic group, at least one ionizable group, or a mixture of at least one ionic group and at least one ionizable group.

* * * * *